Figure 1:
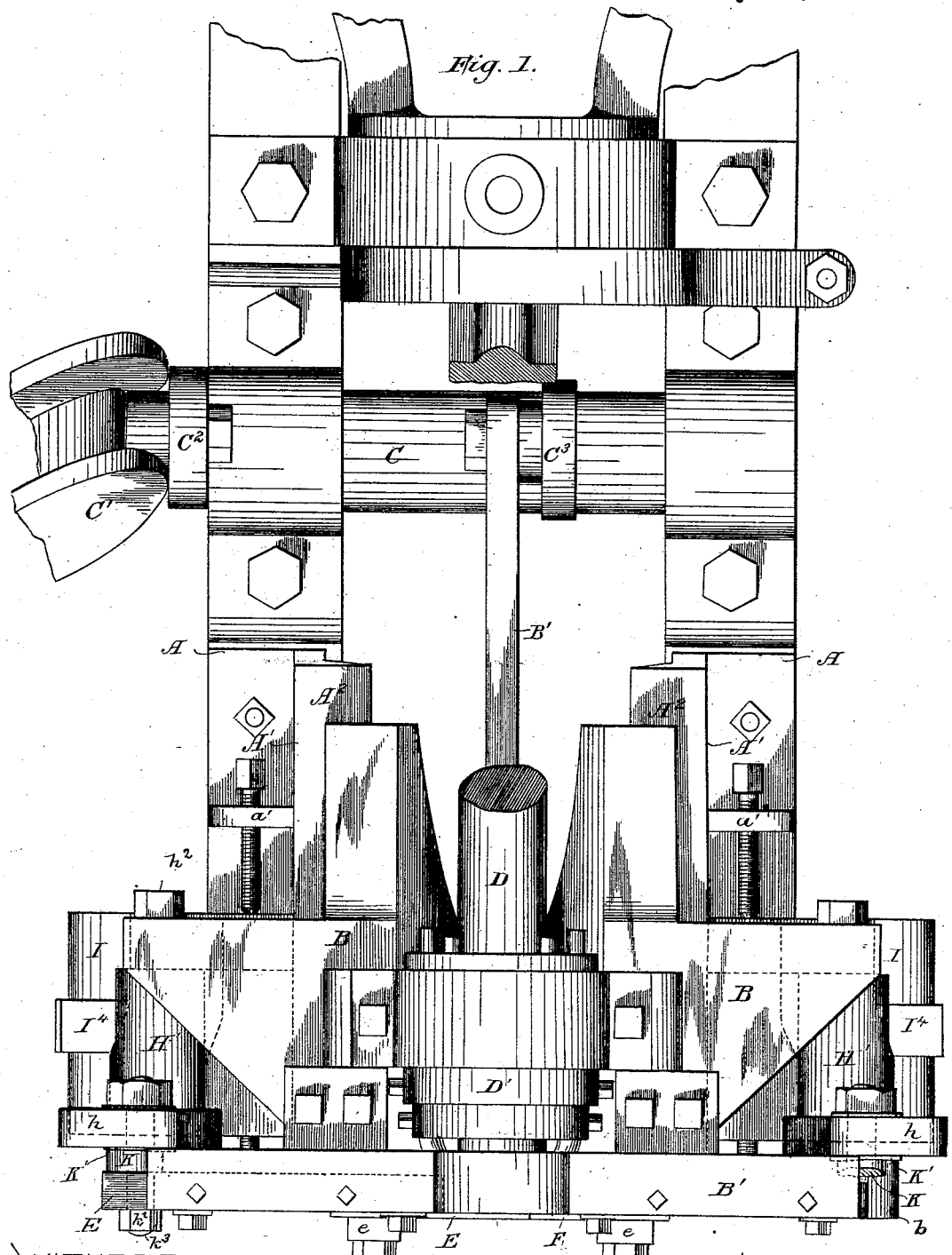

(No Model.) 3 Sheets—Sheet 2.

O. P. BRIGGS.
WIRE BARBING MACHINE.

No. 281,444. Patented July 17, 1883.

Witnesses:
Jno. W. Trickett
C. C. Poole

Inventor:
Orlando P. Briggs
per H. E. Vaughn
Attorney (No Model.)

3 Sheets—Sheet 3.

O. P. BRIGGS.
WIRE BARBING MACHINE.

No. 281,444.

Patented July 17, 1883.

Witnesses:
Jno. W. Hockett.
C. C. Poole

Inventor:
Orlando P. Briggs
per W. E. Dayton
Attorney

UNITED STATES PATENT OFFICE.

ORLANDO P. BRIGGS, OF CHICAGO, ILLINOIS, ASSIGNOR TO THE THORN WIRE HEDGE COMPANY, OF SAME PLACE.

WIRE-BARBING MACHINE.

SPECIFICATION forming part of Letters Patent No. 281,444, dated July 17, 1883.

Application filed March 9, 1883. (No model.)

*To all whom it may concern:*

Be it known that I, ORLANDO P. BRIGGS, of Chicago, in the county of Cook and State of Illinois, have invented certain new and useful Improvements in Wire-Barbing Machines; and I do hereby declare that the following is a full, clear, and exact description thereof, reference being had to the accompanying drawings, and to the letters of reference marked thereon, which form a part of this specification.

This invention relates to machines for the manufacture of barbed fence-wire in which the barbs are of wire coiled about the fence-wire. It is intended more particularly as an improvement on the machine shown and described in Letters Patent of the United States No. 254,767, granted to James J. Hatheway, March 7, 1882. Said machine is contrived for making a two-strand twisted or cable fence-wire having usually double or four-pointed barbs made of wire and coiled between and about the fence-wire strands. For a full understanding of this machine reference is made to the specification of said Hatheway patent; but its general features may be here briefly described as follows: The two fence-wires and the two wires which form the barb are fed from spools mounted on a flyer at the rear end of the machine. The fence-wires extend through passages in a rotating twisting-spindle, and the barb-wires are fed forward from the flyer in a direction practically parallel to the axis of the rotating spindle, and through curved guides in a rotating head secured upon said spindle. Said head and spindle are mounted in a manner suitable for their rotation in a carriage which is contrived and actuated to reciprocate in the direction of the axis of said spindle and of the axis of the flyer, means being provided by which, in the advancing movement of the carriage, the barb-wires are drawn forward off their spools, and in the receding movement of the carriage are forced outward through the curved guides into position between the strands of the fence-wire and across each other. In the path of the barb-wires so fed forward are located two transversely arranged and reciprocating slides provided with projections which engage the ends of the barb-wires and hold them while the fence-wires and barb-wires are revolved, thus causing the ends of the barb-wires which project beyond the fence-wires to be coiled or bent about the said fence-wires. Said reciprocating barb benders or slides carry cutters which are arranged to sever the barb-wires after the barb is coiled; and to this end said cutters are, in the reciprocating movement of the slides to which they are attached, brought against the revolving barb-wires at the points where they emerge from the front vertical face of the twisting-head. Said reciprocating slides are mounted upon the carriage which supports the twisting-head and spindle, and in the machine referred to said slides are reciprocated in a direction transverse to the axis of said twisting-head by means of stationary cam-plates located at the sides of the machine and adjacent to said carriage. The inner or proximate surfaces of said cam-plates are curved to give the proper movement to said slides, and the latter are held in engagement with the curved surfaces of the cam-plates by means of an outwardly-acting and centrally-arranged spring. The ends of the slides are provided with friction-rollers, and by the longitudinal reciprocation of the frame supporting said slides and the twisting-head the slides are carried forward and inward at the proper time and through the necessary distance to accomplish the proper bending and severing of the barbs in the manner set forth. In the said Hatheway machine above briefly described, a difficulty has been found in securing a proper action of the reciprocating cutters by which the barb-wires are severed, the cams which serve to throw the slides carrying said cutters have a tendency to retard the outer ends of the slides, and to thereby throw the inner ends, or the cutting-edges, outward from the face of the twisting-head and the opposing cutters therein secured, so that the coacting knives do not shear closely, and, as a consequence, make a ragged and unsatisfactory cut of the barb-wires. Such movement of the slides and reciprocating cutters is of course very slight, usually being only that which is consequent on a slight play of the slides in their bearings or guides; but it is found in practice that this is sufficient to make the action of the cutters very imperfect and unsatisfactory.

It is the object of this invention to overcome the difficulty above referred to, and to provide a simple and effective construction whereby the co-acting knives or cutters may shear closely, and thus at all times produce a proper, clean, and sharp cut of the barb-wires.

Figure 2:
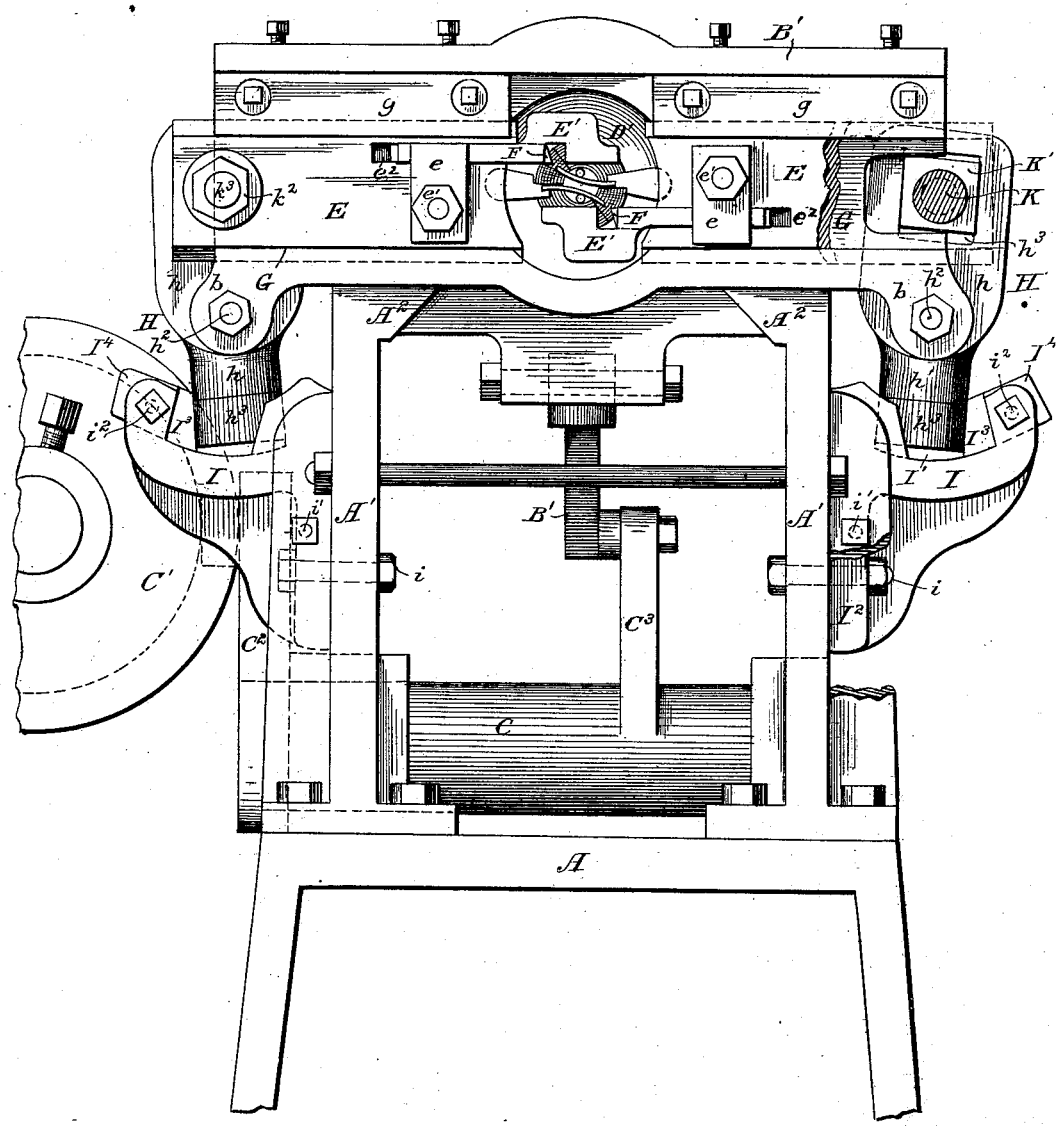
Figure 3:
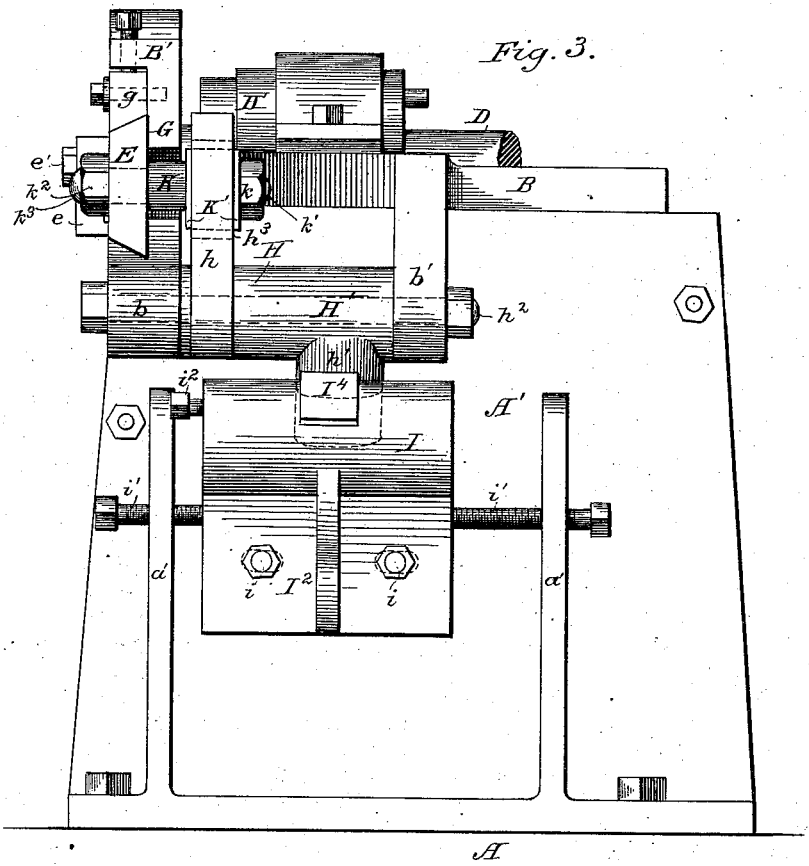
Figure 4:
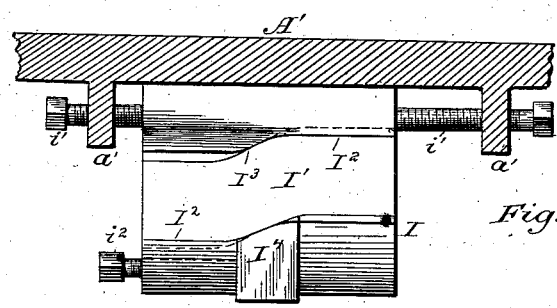

In the drawings, Figure 1 is a plan or top view of a portion of a barb-wire machine containing my improvement, showing the frame carrying the rotating head and cutter-bearing slides, together with means for operating the same. Fig. 2 is an end elevation of the same. Fig. 3 is a side view of the same. Fig. 4 is a detail plan view of the cam-plate for actuating the slides.

In the drawings are shown only those portions of the Hatheway machine above referred to which are immediately involved in the operation of my improvement therein.

In said drawings, A is a portion of the main frame or bed of the machine, and A' A' are plates bolted to the end of said bed, which support the longitudinally-reciprocating frame B, and which are provided with guides $A^2$, upon which said frame slides.

C is a transverse rock-shaft journaled on the frame of the machine at some distance to the rear of the frame B, which is actuated by means of a cam, C', acting upon a crank-arm, $C^2$, placed on the end of the shaft C. Motion is transmitted to the frame B by means of a rod, B', which connects said frame with an upwardly-projecting arm, $C^3$, upon the rock-shaft C. The cam C' is placed upon a shaft driven by the other operative parts of the machine, not necessary to be here described.

D is the twisting-spindle, and D' the reciprocating and rotating head attached thereto, which is mounted on the frame B and moves with it, and through which the barb-wires are fed to the bending mechanism.

E are laterally-reciprocating slides provided with notched inwardly-extending arms E', which accomplish the bending of the barb-wires. Against the rear surface of the arms E' are secured the knives F, and the said arms E' and cutters F are together secured in the groove $e^2$ in the slide E by means of a nut, $e'$, and a clamping-plate, $e$. The slides E are placed in horizontal grooves G in the front face of a transverse cross-piece, B', secured to the frame B, and are held in place therein by removable and adjustable guide-plates $g$, forming the upper walls of said grooves.

The parts described are similar to those shown in the machine illustrated in the patent above referred to, and the operation of such parts in forming and severing the barb is wholly similar to that fully described in such patent.

For the purpose of reciprocating the slides E, I have provided upon either side of the frame B a short vertical lever, H, pivoted on a horizontal axis to the said frame, and having its upper arm, $h$, connected to the slide E, and its lower arm, $h'$, arranged to move in the groove I' of a cam-plate, I, Figs. 2 and 4, constructed to give the end of said arm a lateral movement as the frame B is reciprocated. The lever H is preferably made in the form of a horizontal rock-shaft, H', having two arms, $h$ and $h'$. The shaft H' is pivoted by means of a bolt, $h^2$, between two depending lugs, $b\ b'$, upon the frame B, and the upper arm, $h$, of said shaft is connected by means of a horizontal bolt or stud, K, with the slide E, as best seen in Fig. 3. In order to allow the necessary vertical play to said stud K as the arm $h$ is oscillated on its pivotal center, a slot, $h^3$, Fig. 2, is formed in said arm, in which is placed a sliding block, K', in which the stud K rotates, and to which it is held by means of a nut, $k$, upon a threaded shank, $k'$, formed on said stud. The opposite or front end of the stud K is attached to the end of the slide E by means of a nut, $k^2$, upon its threaded end $k^3$. The downwardly-projecting arm $h'$ of the shaft H' is provided at its lower end with a friction-roller, $h^3$, Fig. 2, which acts against the sides of the cam-groove I' in the cam-plate I. The said cam-plate is attached to the plate A' beneath the rock-shaft H', as shown in Figs. 2 and 3 of the drawings, and is provided with a downwardly-projecting flange, $I^2$, through which and the said plate A' are passed two bolts, $i\ i$, by which the said cam-plate is secured to the plate A'. In order to provide for longitudinal adjustment of the grooved cam-plate I, the apertures in the plate A', through which the bolts $i\ i$ pass, are extended horizontally, as shown by dotted lines in Fig. 3, and abutting-screws $i'\ i'$ are arranged at either end of said cam-plate, which are tapped through projecting flanges $a'\ a'$ on the plate A'. The cam-plates I are adjusted by loosening the nuts $i\ i$ and moving the said plates into the desired position by means of the screws $i'\ i'$. The cam-groove I' is formed with two straight and parallel portions, $I^2\ I^2$, at its ends, and an inclined central portion, $I^3$. The incline $I^3$ may, by the adjusting devices described, be so shifted in relation to the other parts of the machine that the slides E will be actuated at the exact moment necessary to accomplish the bending and cutting of the barb-wires.

For the purpose of compensating for any wear that may take place in the inclined portion $I^3$ of the cam-groove I', a block, $I^4$, is inserted in the plate I, the inner end of which forms one side of the said inclined portion. The block $I^4$ is held in place by a set-screw, $i^2$, which may be loosened and the said block adjusted as is found necessary for the purpose stated.

By the construction described any longitudinal movement of the shaft H' on its bearings, owing to retardation of the oscillating part $h'$, which is in contact with the cam-groove, will be without effect on the slide E, because of the sliding connection between the stud K and the arm $h$. The transverse reciprocating motion given to the slide E is therefore direct and positive, with no tendency to a lateral or side movement in said slides. There is therefore no strain on their bearings, and no tendency to move the cutters F from their working position with reference to the opposing cutters in the face of the twisting-head D.

I claim as my invention—

1. The combination, with the reciprocating and rotating twisting-head, and transverse reciprocating cutter-bearing slides mounted on the frame which supports said head, of levers pivoted to the said frame and connected with the slides, and means for actuating the said levers, substantially as and for the purpose set forth.

2. The combination, with the reciprocating and rotating twisting-head, and transverse reciprocating cutter-bearing slides, mounted in the frame which supports said head, of levers pivoted to said frame and connected to the slides, and cam-plates attached to the frame of the machine, constructed to engage the said levers for the purpose of actuating the slides, substantially as described.

3. The combination, with the reciprocating and rotating twisting-head, and transverse reciprocating cutter-bearing slides mounted on the frame which supports the said head, of vertical levers horizontally pivoted to the said frame, and having their upper arms connected with said slides, and stationary plates provided with cam-grooves constructed to engage the lower arms of said levers for the purpose of reciprocating said slides, substantially as described.

4. The combination, with the reciprocating rotating head, and transverse reciprocating slides mounted on the frame which supports the said head, of levers pivoted to said frame at both sides of the machine, and having sliding connection at their upper ends with the said slides, and cam-plates attached to the frame of the machine, constructed to engage the lower arm of said levers, substantially as and for the purpose set forth.

5. The combination, with the reciprocating and rotating twisting-head, a longitudinally-reciprocating frame supporting said head, and transverse reciprocating slides mounted on said frame, of levers pivoted to said frame and connected to the said slides, and cam-plates attached to the frame of the machine, and means for adjusting the position of said cam-plates, substantially as described.

6. The combination, with the longitudinally-reciprocating frame, the transverse reciprocating cutter-bearing slides mounted on said frame, and a cam-plate, I, attached to the frame of the machine, of a rock-shaft, H′, pivoted to said frame, having a slotted arm, $h$, and an opposite arm, $h'$, a stud, K, attached to the slide, and a block, K′, pivoted on said stud and arranged to move in the slot of the arm $h$, substantially as and for the purpose set forth.

7. The combination, with the longitudinally-reciprocating frame, the transverse reciprocating cutter-bearing slide mounted in said frame, and a lever pivoted to said frame and having its upper arm connected to said slide, of a cam-plate, I, provided with a cam-groove, I′, constructed to engage the lower arm of said lever, and screws $i$-$i'$, for adjusting the position of said cam-plate upon the machine-frame, substantially as described.

In testimony that I claim the foregoing as my invention I affix my signature in presence of two witnesses.

ORLANDO P. BRIGGS.

Witnesses:
M. E. DAYTON,
JESSE COX, Jr.